June 6, 1961 H. E. A. BORZER 2,987,131
ELECTRICALLY OPERATED AUTOMATIC PLATFORM SCALES
Filed July 7, 1958 6 Sheets-Sheet 3

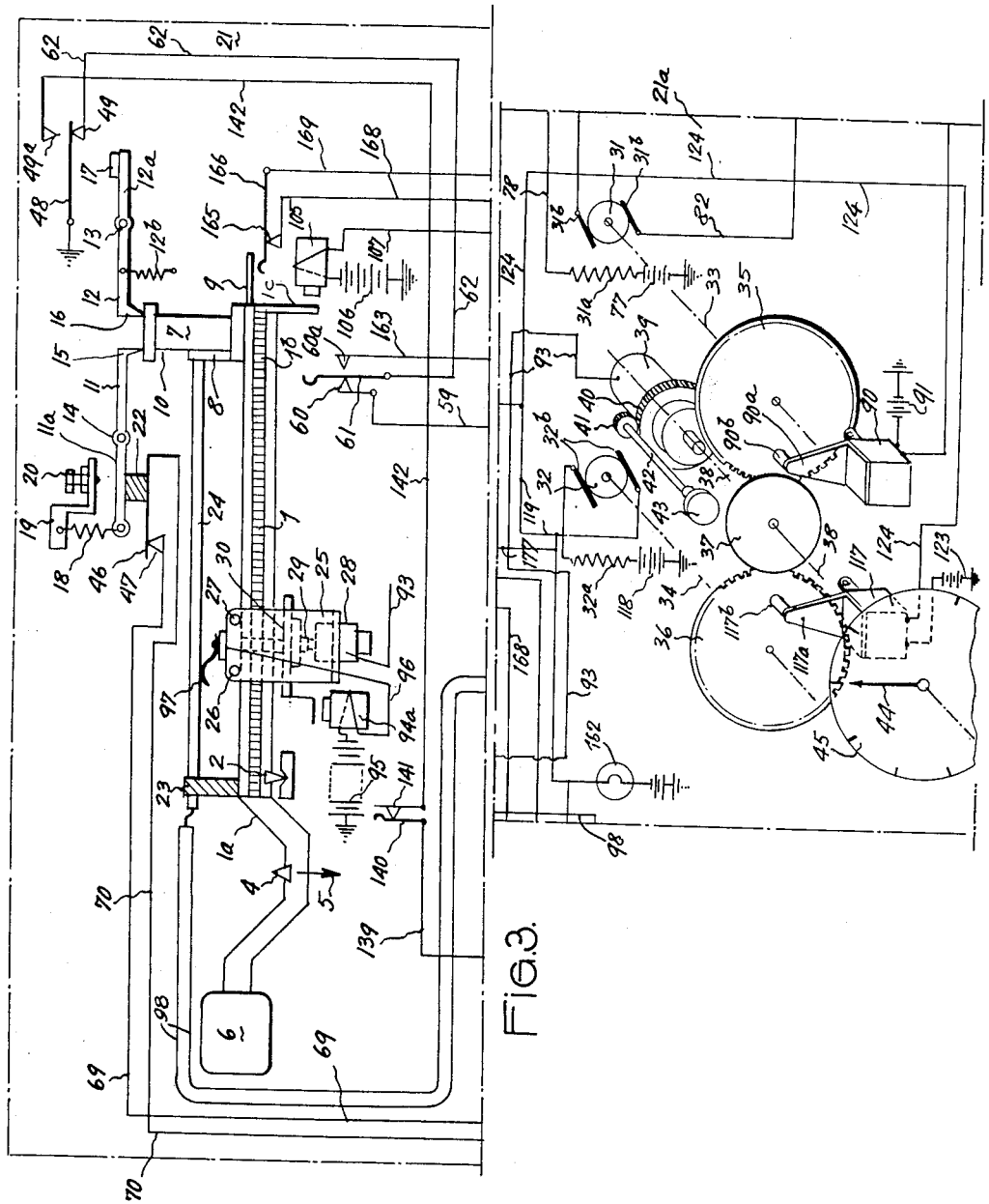

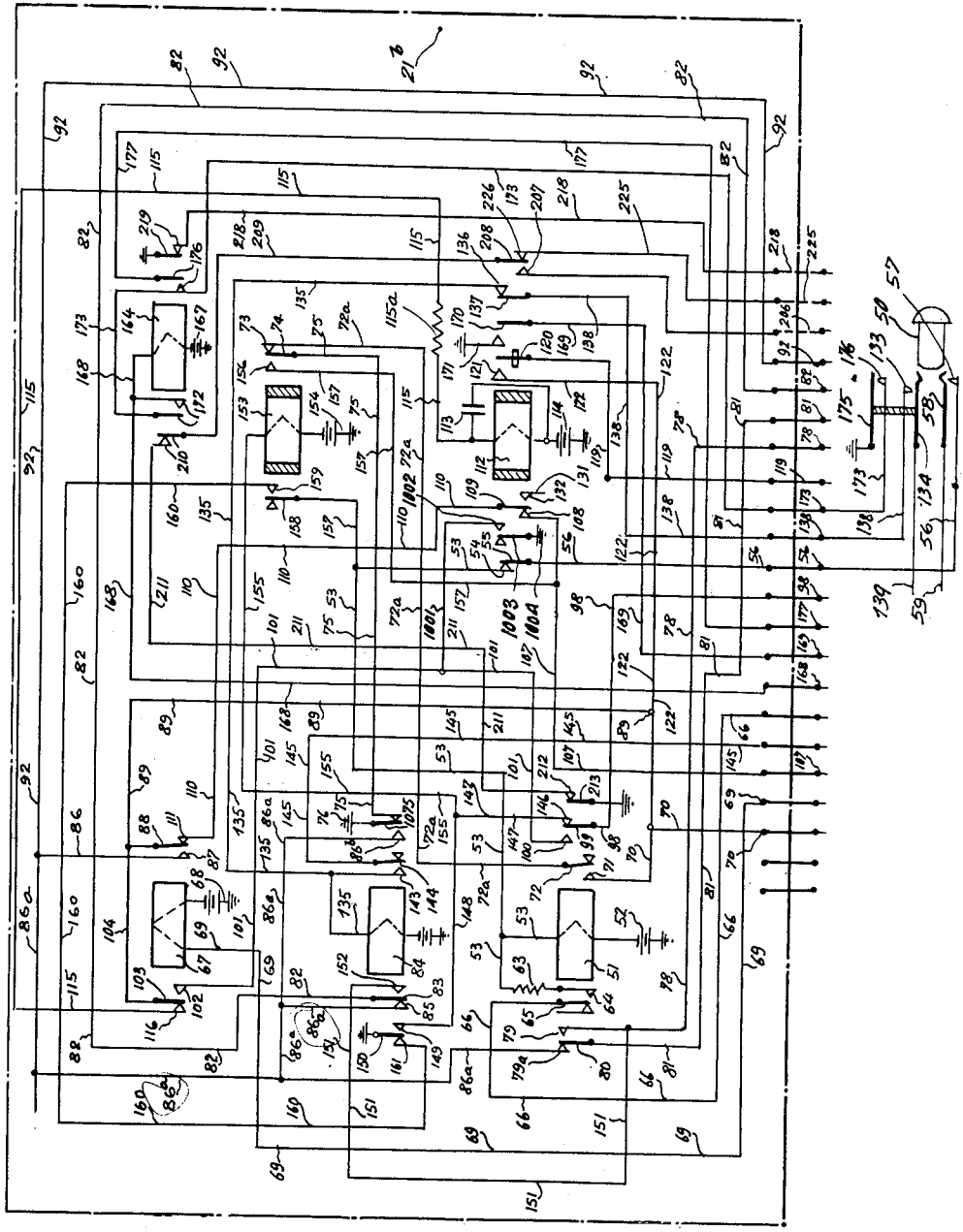

Inventor
Henri Edouard Alfred Borzer
By Alvin Browdy
Attorney

June 6, 1961  H. E. A. BORZER  2,987,131
ELECTRICALLY OPERATED AUTOMATIC PLATFORM SCALES
Filed July 7, 1958  6 Sheets-Sheet 5
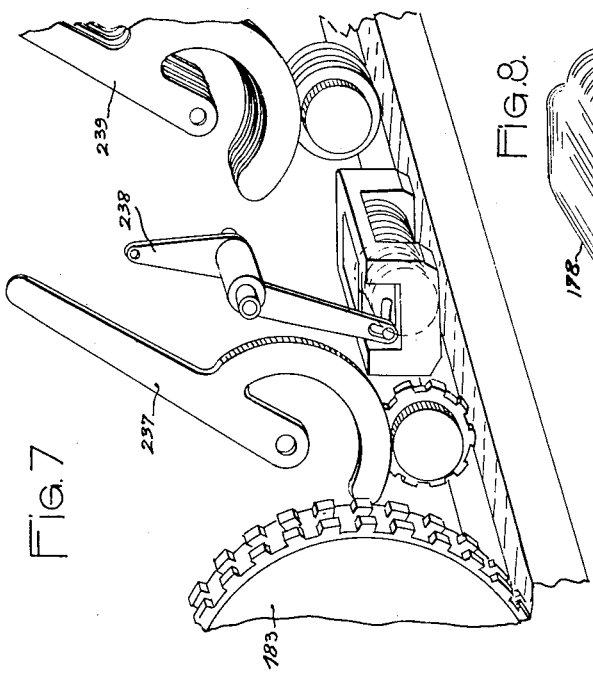
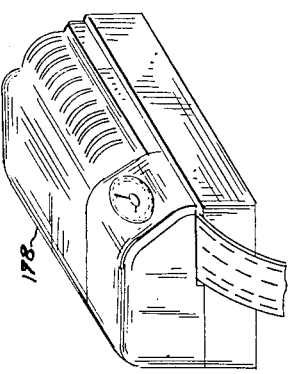
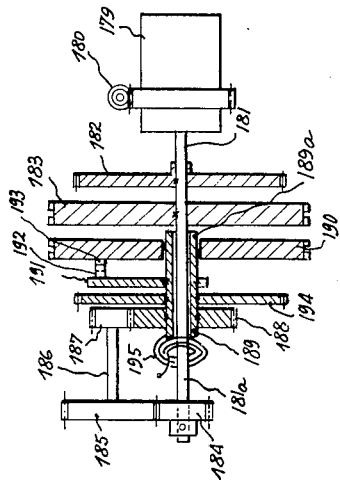
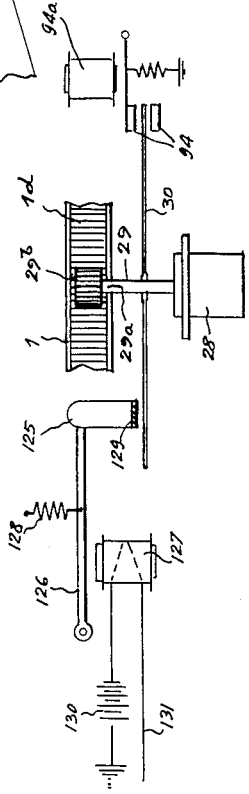
Inventor
Henri Edouard Alfred Borzer
By Alvin Browdy
Attorney June 6, 1961 H. E. A. BORZER 2,987,131
ELECTRICALLY OPERATED AUTOMATIC PLATFORM SCALES
Filed July 7, 1958 6 Sheets-Sheet 6

Inventor
Henri Edouard Alfred Borzer
By Alvin Browdy
Attorney

United States Patent Office 2,987,131
Patented June 6, 1961

2,987,131
ELECTRICALLY OPERATED AUTOMATIC PLATFORM SCALES
Henri Edouard Alfred Borzer, Bethune, Pas-de-Calais, France, assignor to Manufacture d'Horlogerie de Bethune, Pas-de-Calais, France, a company of France
Filed July 7, 1958, Ser. No. 747,049
Claims priority, application France July 12, 1957
13 Claims. (Cl. 177—211)

The present invention relates entirely to automatic electrically operated platform scales.

According to the invention, the electrically operated automatic platform scales are characterised in that they comprise a beam along which a slide-weight moves composed of a carriage carrying a receiver rotatively driving a pinion cooperating with a rack carried by the beam, the receiver of the carriage being electrically connected to an emitter-transmitter whose rotation is operated in the first place by a motor rotating at high speed and in the second place by a motor rotating at low speed, so that, owing to the rotation of the rotor of the emitter-transmitter, the rotor of the receiver mounted on the carriage forming a slide-weight moves the latter so that it brings the beam into equilibrium, which causes the stoppage of the aforesaid motors, the emitter-transmitter and the receiver; by means of a pointer, the weight is thus ascertained of the object weighed on the scales, this pointer, which moves in front of a graduated dial, being integral with the rotor of the emitter-transmitter.

Various other characteristics of the invention will moreover be revealed by the detailed description which follows.

One form of embodiment of the purpose of the invention is shown, by way of example, in the attached drawings.

The automatic platform scales are diagramatically shown in FIGS. 1, 2, 3 and 4.

FIG. 5 is a diagram of a supplementary device fitted on the slide-weight of the automatic platform scales.

FIG. 6 is an elevation-section showing a detail of one of the members of FIG. 4.

FIG. 7 is a perspective view of a part of the printing device shown in FIG. 4.

FIG. 8 is a perspective view of a small box containing the printing and direct reading devices that can be placed remote from the platform scales.

Figure 3A:
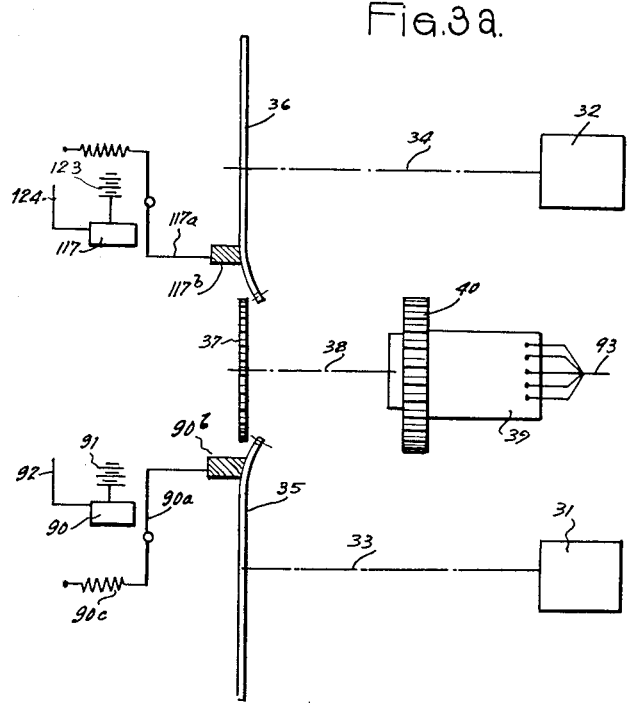
FIG. 3a is a diagrammatical plan of a part of the mechanism operating the scales.

In FIG. 1, the beam 1 of the automatic platform scales is supported by a fulcrum 2 bearing on a part 3 integral with the frame of the scales. A second fulcrum 4 is attached to the rear part 1a of the beam 1 and connected to this beam by a part 5 underneath the platform of the scales.

6 designates the counterpoise fixed to the rear end of the beam. The latter carries a flexible blade 1c and a small pillar 7 at its front end 1b. An insulating support 8 and a finger 9 are fixed near the base of the small pillar 7 on opposite sides of the latter.

10 designates a platform attached to the upper part of the small pillar 7. Two levers 11, 12 hinged on spindles 13, 14 integral with the frame of the scales comprise fingers 15, 16 resting on the platform 10. The end 12a of the lever 12 carries an insulator 17, whereas the end 11a of the lever 11 is connected by a spring 18 to a T-iron 19 fixed on the frame of the scales, this T-iron carrying an adjustable stop 20.

22 designates an insulating buffer placed under the lower part 11a of the lever 11.

Near to its part 1a, the beam 1 carries an insulating support 23. Conductor wires 24 are stretched between the insulating support 23 and the insulating support 8 integral with the small pillar 7. The wires 24 are parallel to the beam 1. A carriage 25 formed by a U-shaped armature is provided with rollers 26, 27 running on the upper part of the beam 1. The carriage 25 carries a receiving device 28 whose shaft 29 is provided with a disc 30.

The end 29a of the shaft 29 carries a pinion 29b cooperating with a rack 1d cut on the beam 1, as shown in FIG. 5.

The unit which has just been described, is ordinarily placed inside a box 21 placed near to the underneath of the platform of the scales and forming part and parcel with them. A second box 21a contains two motors 31, 32 (FIG. 3) whose shafts 33, 34 each carry a flexible pinion 35, 36. An intermediate pinion 37 can mesh, at one time with the pinion 35, at another time with the pinion 36, and is mounted on a shaft 38 of a remote emitter-transmitter 39; the latter comprises teeth 40 on its periphery meshing with a pinion 41 fixed on a shaft 42 provided with a milled knob 43. The emitter-transmitter 39 is a self synchronous transmitter, usually known under the name of Selsyn or Autosyn.

The shaft 38 is extended forward from the pinion 37 for carrying a pointer 44 placed in front of a dial 45 for visually showing the weight.

Presuming that the carriage 25, hereinafter called the slide-weight, is at rest, i.e., near to the fulcrum 2 on which the beam rests, the latter occupies a sloping position, called the high position, its end 1b being raised to the maximum and thus the contact 46 rests on the stud 47, whereas the contact 48 rests on the stud 49. If any article is required to be weighed, it is placed on the platform of the scales, then the button 50 (FIG. 3) is pressed. The circuit of a relay 51 (FIG. 2) is then closed. The power source 52 of this relay, which is a relay 51 excited by the electric source, closes by means of the circuit 53, the stud 54, the contact 55, then the circuit 56, the stud 57, the contact 58, the circuit 59, the stud 60, the contact 61, the circuit 62, the stud 49, the contact 48, an earth ensuring the operating of the relay 51. This relay then closes, through a resistance 63 of the stud 64 and contact 65, a circuit 66 rejoining the circuit 59. The actuating of the relay 51 has the effect of closing the power source of the relay 67 by the following circuit: starting from the power source 68, a conductor 69, a stud 47, a contact 46, a circuit 70, a stud 71, a relay 51, a contact 72, a conductor 72a, a stud 73, a contact 74, a circuit 75, ending in the earth 76.

The circuits are thus ready for feeding the high speed motor 31. Starting from the power source 77 of the motor 31, the current passes through the stator 31a, then by the conductor 78, the stud 79, the contact 80, the conductor 81, the rotor 31b, the conductor 82, the contact 83 of a relay 84, the stud 85 of the same relay, the conductor 86, the stud 87, the contact 88, the conductor 89, the stud 71, the contact 72, the conductor 72a, the stud 73, the contact 74, the conductor 75, the earth 76.

At the same time, the relay 51 has closed a circuit for feeding the electro-magnet 90. The current starting from the power source 91 passes through the electro-magnet 90, then by the circuit 92, 86, the stud 87, the contact 88, the conductor 89, 70, the stud 71, the contact 72, the conductor 72a, the stud 73, the contact 74, the conductor 75, contact 1075 and the earth 76.

The armature 90a of the electro-magnet 90 carries a finger 90b which normally presses under the action of a spring (not shown) against the flexible pinion 35, which is deflected. As soon as the electro-magnet 90 is fed, the finger 90b recoils and the flexible pinion 35 meshes with the pinion 37 integral with the shaft carrying the emitter-transmitter 39 (FIG. 3a). The motor 31 revolving at high speed, the movement is transmitted by the pinions 35, 37 to this emitter-transmitter 39 which is electrically linked up by conductors 93 to the receiver 28 mounted on the slide-weight 25. From that moment, the latter can move for obtaining the balance of the beam 1. The rotation direction of the motor 31 is selected so that the emitter-transmitter 39 causes the receiver 28 to revolve in a direction whereby the slide-weight 25 moves from the end 1a of the beam towards the end 1b. A brake 94 is fitted on the slide-weight 25 for locking the disc 30 integral with the shaft 29 of the receiver 28. Thus, in order to move the slide-weight 25, the brake 94 must be released, operated by an electro-magnet 94a. The latter is then fed in the following manner: from the source 95, the current passes through the electro-magnet 94a, then from there, by a flexible conductor 96, it reaches a sliding contact 97 in contact with one of the wires 24, passes through the conductor 98, the contact 99, the stud 100, the conductor 101, the stud 102 of the relay 67, the contact 103, the conductor 104, the conductor 89, the conductor 70, the stud 71, the contact 72, the conductor 72a, the stud 73, the contact 74, the conductor 75, the contact 1075 to the earth 76. The brake 94 is thus released and the disc 30 can revolve freely. The slide-weight 25 can then advance without being hindered by its brake. When it has travelled a sufficient distance for its weight, assisted by the spring 18 (FIG. 1) connected to the lever 11 to tip the beam 1, the latter assumes a position determined by the adjustment of the stop 20. Actually, as soon as the lever 11 reaches this stop, the action of the spring 18 ceases and the beam 1 stops falling, and remains in a slightly sloping position, called "semi-high." The slide-weight is not sufficiently advanced for ensuring the balance, and thus, the switch, formed by the contact 48 and the stud 49 remains closed. To guard the beam 1 from harmful oscillations, owing to the fact that the slide is already relatively close to the balanced position, the latter is locked by means of an electro-magnet 105 co-operating with the flexible blade 1c. This operation takes place as follows: as the beam has reached the semi-high position, the contact 46 has left the stud 47 and thus opens the circuit of the relay 67 which falls again. The electro-magnet 105 can then be put under voltage as the current coming from the power source 106 passes through the conductor 107, the stud 108, the contact 109, the conductor 110, the stud 111, the contact 88, the conductor 89, the stud 71, the contact 72, the conductor 72a, the stud 73, the contact 74, the conductor 75, the earth 76. The blade 1c is thus attracted by the electro-magnet 105 and the beam 1 is locked. At the same time that the electro-magnet 105 is fed, a relay 112 is put under voltage. This relay, whose operating is delayed by the capacities 113, is fed by the following circuit: from the source 114, the current passes through the conductor 115, the resistance 115a, again through the conductor 115, the stud 116, the contact 103, the conductors 104, 89, the stud 71, the contact 72, the conductor 72a, the stud 73, the contact 74, the conductor 75, the earth 76. Owing to the fact that the relay 112 is delayed and thus only operates a certain time after being put under voltage, the electro-magnet 105 remains under voltage during an equivalent time enough to prevent any harmful oscillation of the beam 1. Seeing that the feed circuits of the high-speed motor 31, of the electro-magnet 90 controlling the clutching of the flexible pinion 35 and the electro-magnet 94a controlling the brake 94, are controlled by the relay 67 and that the latter is no longer under voltage, all the electric circuits feeding the three above-mentioned devices are open and this has the effect, firstly, of stopping the high speed motor 31, then, of disengaging the teeth of the pinion 35 from the teeth of the pinion 37 and locking the disc 30 integral with the receiver 28 placed on the slide-weight 25. The latter is thus stopped.

During the operating of the relay 112, there occurs, on the one hand, the opening of the feed circuit of the electromagnet 105, the releasing of the flexible blade 1c, and on the other hand, a starting up of the low speed motor 32, then the exciting of the electro-magnet 117 enabling the engaging of the flexible pinion 36 with the pinion 37 and the fresh exciting of the electro-magnet 84a releasing the brake 94 liberating the disc 30 integral with the receiver 28 of the slide-weight 25. The motor 32 is put under voltage by the following circuit: the current starting from the power source 118 passes through the stator 32a of the motor, then through the rotor 32b and from there by a conductor 119 as far as a contact 120 which just bears on the stud 121 connected by a conductor 122 to the conductor 89; this terminates at the stud 71 by the contact 72, the conductor 72a, the stud 73, the contact 74 and the conductor 75, the current reaches the earth 76. The motor 32 thus revolves and drives the flexible pinion 36 meshing with the pinion 37 mounted on the shaft 38 of the emitter-transmitter 39. The electro-magnet 117 is fed from a source 123. The current passes through the coil of the electro-magnet, then finds an earth, by means of the conductors 124, 119, the contact 120, the stud 121, the conductor 122, the conductor 70, the stud 71, the contact 72, the conductor 72a, the stud 73, the contact 74, the conductor 75 and reaches the earth 76. The electro-magnet 94a of the brake 94 is fed by the following circuit: current source 95, flexible conductor 96, sliding contact 97, one of the wires 24, conductor 98, contact 99, stud 100, conductor 101, stud 102, contact 103, conductor 104, conductor 89, stud 71, contact 72, conductor 72a, stud 73, contact 74, conductor 75, earth 76.

We thus see that after a short stoppage the slide-weight 25 again starts up but at a reduced speed, and moves gently towards its balance point. When this balance is attained, the beam assumes a horizontal position and immediately causes the switch to open formed by the contact 48 resting on the stud 49. Actually, the lever 12 pivots under the action of the small spring 12b and the insulator 17 raises the contact 48. The opening of the switch 48, 49 has the effect of causing the opening of the feed circuit of the relay 51, immediately followed by the opening of the feed circuit of the electro-magnet 94a of the brake 94. The latter again locks the disc 30 and stops the receiver 28. Actually, the ending of the feed of the relay 51 causes the switch to open formed by the stud 71 and the contact 72, the circuit of the electro-magnet 94a is then open. Likewise, in that which precedes, we have seen that the maintenance circuit of the relay 51 found an earth behind the contact 48. The dropping of the relay 51 immediately causes the stoppage of the motor 32, because the latter has found an earth through the intermediary of the circuit controlled by the stud 71 and the contact 72.

On account of the reversible electric connection of the rotor of the emitter-transmitter 39 with the rotor of the receiver 28, the rotor of the receiver can accurately align the rotor of the emitter-transmitter on the position which is function of the balance position of the beam 1. Thus, the pointer 44 attached to the end of the shaft 38 of the emitter-transmitter 39, becomes motionless in front of the dial 45 while showing exactly the weight of the load on the platform of the scales. Weighing is finished.

To enable a uniform advancing of the slide-weight 25 when running slow, a permanent braking device has been provided which is applied to the disc 30 at the moment of this slow running, this braking being operated by the friction of a finger 125 mounted at the end of the mobile armature 126 of an electro-magnet 127

(FIG. 5). 128 designates the recoil spring of the armature 126. A small brake shoe 129 is attached to the lower end of the finger 125 and it is through its intermediary that the latter brakes the rotation of the disc 30. As explained above, the feed circuit of the low speed motor 32 is ensured by means of the relay 112. Now, the feed circuit of the electro-magnet 127 starting from the source 130 passes through a conductor 131 (FIG. 2) ending at the stud 132 on which the contact 109 rests, which, through the intermediary of the conductor 110, the stud 111, the conductor 88, the conductor 89, the stud 71, the contact 72, the conductor 72a, the stud 73, the contact 74, the conductor 75, reaches the earth 76. The slow rotation of the receiver 28 is thus regularised and an increased accuracy is obtained for weighing.

The first weighing having terminated, the load placed on the platform is removed, and a new one positioned, it being then presumed that the new load is of less weight than that of the preceding load. In this case, the beam will be in a position sloping downwards, seeing that the slide-weight 25 has gone past its balance point. In that which follows, the position of the beam is called "low position." The contact 48 then rests against the stud 49a because the lever 12 is raised under the action of the spring 12b. The contact 46 is separated from the stud 47 because the lever 11 has pivoted under the action of the spring 18. The button 50 is then pressed; the switch formed by the contact and stud 57, 58 does not close any circuit, whereas the circuit closed by the switch former by the stud 133 and the contact 134 feeds the relay 84 by the following circuit, relay 84, conductor 135, stud 136, contact 137, conductor 138, stud 133, contact 134, conductor 139, contact 140, stud 141, conductor 142, stud 49a, contact 48, and earth. The putting under voltage of the relay 84 has the effect of closing a switch formed by the stud 143 and the contact 144 connected to the conductor 145 terminating at the conductor 139. The relay 84, which is thus independent from the operating button 50, causes the closing of the feed circuit of the electro-magnet 94a releasing the brake 94, then the feed circuit of the motor 31 in the opposite direction to the preceding one and the putting under voltage of the electro-magnet 90 controlling the engaging of the flexible pinion 35 with the pinion 37. The electro-magnet 94a is fed by the circuit terminating at the conductor 98 reaching the contact 99 resting on the stud 146 connected by the conductor 147 to the conductor 148 linked up to the stud 149 on which the contact 150 rests integral with an earth. Thus, the brake 94 is released and the disc 30 is free. The closing of the feed circuit of the motor 31 takes place in the following manner: the current passes through the stator 31a, the conductor 78, the conductor 151, the stud 152, the contact 83, the conductor 82, the rotor 31b, the conductor 81, the contact 80, the stud 79a, the conductor 86a, the stud 86b and reaches the earth 76. The direction of the passage of the current is reversed and the motor revolves in an opposite direction to the preceding one, so that the slide moves from the end 1b of the beam towards the end 1a.

As previously, the feed circuit of the electro-magnet 90 ensuring the engaging between the flexible pinion 35 and the pinion 37 is as follows: current source 91, electro-magnet coil 90, conductor 92, conductor 86a, stud 86b, earth 76. The relay 84 has the additional function of closing the feed circuit of the delayed relay 153, because that relay, fed from the source 154, is connected by the conductor 155 to the conductor 148 terminating at the stud 149 on which the contact 150 rests that is earthed. The contact 74 then bears on the stud 156.

When the slide-weight 25 is moved sufficiently far along the beam 1, the latter abruptly assumes the high position, which it occupied when starting up for the first weighing. This movement causes the dropping of the contact 48 which has again pressed on the stud 49, and at the same time, owing to the pivoting of the lever 11, the closing of the switch formed by the contact 46 which rests on the stud 47. As soon as the contact 48 has ceased to bear against the stud 49a, the maintenance circuit of the relay 84 is open and the latter falls, while opening the feed circuits of the electro-magnet 94a preventing the working of the brake 94 of the motor 31, of the electro-magnet 90 controlling the clutch ensuring the connectiton between the flexible pinion 35 and the pinion 37. At the same time, the feed circuit of the relay 153 is open, but the latter, which is delayed, does not fall immediately, and thus, the electro-magnet 105 attracting the blade 1c attached to the end 1b of the beam, is excited through the circuit starting from the feed 106, passing through the conductor 107, the conductor 157, the stud 156 on which the contact 74 rests connected by the conductor 75 to the earth 76. In this manner, an inopportune oscillation of the beam 1 is prevented during a very short time equal to that taken by the delayed relay 153 to fall. Owing to the fact that this relay 153 is delayed, the feed circuit of the relay 51 is closed, through the intermediary of the conductors 53, 157, the contact 158, the stud 159, the conductor 160 terminating at the stud 161 on which the earthed contact 150 rests. The putting under voltage of the relay 51 has the effect of closing its maintenance circuit passing through the conductor 53, the resistance 63, the stud 64, the contact 65, the conductor 66, the conductor 59, the stud 60, the contact 51, the conductor 62, the stud 49, the earthed contact 48. At that moment, as the relay 153 falls and the relay 51 is under voltage, the scales are in the same conditions as at the beginning of the first weighing described, and thus, the same operations take place.

The functions are as follows:

The motor 31 is started up, the clutch 90b brings the flexible pinion 35 into mesh with the pinion 37 integral with the emitter-transmitter 39, the brake 94 is released, for the electro-magnet 94a is under voltage, the slide-weight 25 moves at high speed along the beam and close to the balance position it begins to tip, which has the effect of opening the switch 46, 47. Immediately, the electro-magnet 105 is fed and the beam 1 is locked during a very short space of time. At the same time, the motor 31 ceases to be fed as well as the electro-magnet 90. The pinion 35 is no longer coupled up with the pinion 37, the brake 94 acts again and locks the disc 30. Simultaneously, the motor 32 is put under voltage as well as the clutch 117. The flexible pinion 36 meshes with the pinion 37, the electro-magnet 94a is again fed and the friction device 125, 129 ensures the regularity of the slow rotation of the disc 30 integral with the receiver 28. As soon as the beam 1 reaches its balance point, the switch 48, 49 opens. The motor 32, the clutch electro-magnet 117, the electro-magnet 94a, are no longer fed, the slide-weight 25 stops and its brake 94 locks it in the balance position; the second weighing has finished.

In the foregoing, the information about the weight has been given by the pointer 44 moving in front of the dial 45 and this, by presuming that the scales has been calibrated beforehand, i.e., that the pointer, at the moment of the commencement of weighing operations, had been placed exactly opposite to zero on the dial.

If, after several successive weighings or after not using the scales during a given time, this pointer is no longer opposite to zero on the dial, it must be arbitrarily brought back to it by turning the milled button 43 actuating the shaft 42 carrying the pinion 41 meshing with the teeth 40 carried by the emitter-transmitter 39. This movement has the effect of acting on the rotor of the emitter-transmitter 39 and the latter moves at the same time as the pointer 44 mounted on the shaft 38 integral with the rotor. This facility of being able to turn the pointer 44 also allows any reckoning to be avoided when it is desired to ascertain the net weight of goods weighed with their container. Actually, all that is necessary is to know the weight of the container, and before weighing, to turn back the pointer, by means of the milled knob 43, to a position in front of zero corresponding to the weight of the container so that when the empty container is placed on the scale, it will read zero. When the weighing of the container and contents has been accomplished, the weight of the contents can be directly read on the dial.

In that which precedes, the scales never return to a rest position between each weighing, this rest position being the one in which the slide is placed close to the fulcrum 2 integral with the beam 1. But, in the case where the scales must give the total amount of the weight weighed during a given space of time, the slide-weight 25 must return after each fresh weighing to its rest point. This operation could be carried out by adding an additional circuit feeding the motor 31 when the beam passes from the balance position to the low position at the moment when the load is removed from the platform of the scales. This function could be carried out by a mobile contact on which the beam 1 would rest and which would close a feed circuit terminating at an earth, the passage direction of the current in the motor 31 being the passage direction planned when describing the second weighing, i.e., when the slide-weight 25 comes from the end 1b of the beam towards the end 1a.

When the slide-weight 25 arrives close to the fulcrum, either for being put at rest, or that the freedom of the beam is hindered by some accident, this slide-weight actuates the contact 140 which quits the stud 141, thus opening the circuit of the relay 84. The latter drops and immediately stops the slide, seeing that it controls the feed circuit of the motor 31 at the time of the return to the rear of the slide-weight 25. Likewise, if, for any reason whatsoever, the slide-weight 25 comes close to the end 1b of the beam 1, it rocks the contact 61, which separates from the stud 60. Immediately, the power source of the relay 51 is cut out. The slide-weight 25 stops because the relay 51 controls the feed circuit of the motor 31 when the slide-weight 25 moves from left to right (FIG. 1) along the beam. As the contact 61 now bears on the stud 60a, it closes the feed circuit of a lamp 162 connected by a conductor 163 to the stud 60a. This lamp, which lights up in front of the individual checking the weighing, shows that the weight given by the pointer 44 is wrong and must not be taken into consideration. Seeing that the scales can be installed at a certain distance from the point showing the weight, and that, owing to this, the person in charge of recording the weights cannot always see what is happening on the platform of the scales, it is necessary, in order to prevent fraud or false weights caused by an error in operating or some kind of accident, to draw the attention of the person recording weights, every time during weighting when an external force influences the latter. These external forces can be, either forces directed from top to bottom, or on the contrary, from bottom to top. In both cases, an inopportune fall of the beam takes place, whereas in normal weighing, the latter becomes motionless at the horizontal, advantage is taken of this difference to actuate the relay 164 which lights up the lamp 162 (FIG. 2).

When, owing to external interference, the beam begins to drop and at the moment when it passes to the horizontal, the contact 48 cuts out the circuit of the relay 51, which drops immediately. The contact 71 leaves the stud, and at the same time the circuit of the relay 112 is opened, but the latter, which is delayed, remains steady during the discharge time of the condensers. The beam 1 has thus time to fall completely before the relay 51 falls. On reaching the low position, the beam actuates with its finger 9, the switch formed by the stud 165 and contact 166. The feed circuit of the relay 164 is as follows: a current starts from the source 167 passes by the conductor 168, the stud 165, the contact 166, the conductor 169 and, owing to the fact that the relay 112 has not yet dropped, the contact 170 bears against the earthed stud 171. The activating of the relay 164 has the effect of closing a switch 172, which, by a conductor 173, terminates at a stud 174 on which the earthed contact 175 rests. At the same time the relay 164 closes the switch 176 which, by the conductor 177, closes the feed circuit of the lamp 162. The latter lights up and then the person taking the weights on the scales orders a new weighing.

In certain cases, the scales can also include elements for printing the weights.

A small box 178 (FIG. 4) which can be placed alongside the small box 21a containing the motors 31, 32 and the emitter-transmitter 39, or at some distance from this small box 21a, contains a printing receiver 179 provided with a device 180 for returning to zero identical to that of the emitter-transmitter 39. The shaft 181 of the receiver 179 carries a pinion 182 and a printing roller 183 showing the weight in kilogrammes and tens of kilogrammes. The end 181a of the shaft 181 carries a pinion 184 meshing with a pinion 185 mounted on a secondary shaft 186 to whose end a pinion 187 is attached meshing with a pinion 188 mounted on a bushing 189 loosely slipped on the shaft 181. The bushing 189 (FIG. 6) carries a printing roller 190 at its end 189a for printing the weights in hundreds and thousands of kilogrammes. The roller 190 is mounted loosely on the bushing 189 and connected to the latter by means of an arm 191 carrying a small resilient lamina 192 cooperating with a spur 193 integral with the engraved roller 190. This driving of the roller 190 by the arm 191 is identical with a drive by a "toc," (a small finger) but in this case, the latter is resilient.

194 designates a pinion integral with the bushing 189. A spring 195 is fixed on the bushing 189 and tends to bring the latter towards its rest position, i.e., towards the zero position. The opposite end of the spring is, for example, attached to some point on the frame holding the shaft 181. A fork 196 (FIG. 4) which has two fingers 197, 198 cooperating with the pinions 182, 194, extends the mobile armature 199 of an electro-magnet 200 whose role will be explained farther on. A striker 201 is attached to the end of a small plate 202 hinged on the frame of an electro-magnet 203. The end 202a of the small plate 202 acts as a mobile armature for the electro-magnet 203.

During weighing, the receiver 179 remains in synchronism with the emitter-transmitter 39, so that on concluding weighing, the printing rollers 183, 190 assume a position which corresponds to the weight shown by the pointer 44 of the visual indicator. When weighing is finished, when the relay 51 falls, the relay 204 is put under voltage. The circuit is as follows: the feed source 205 sends a current through the relay 204, and, by the conductor 206, reaches the stud 207. As the relay 112 has not yet dropped, owing to its delay, the contact 208 rests on the stud 207 and by the conductor 209 the current passes by the intermediary of the switch 210 and by the conductor 211 reaches the stud 212 on which the earthed contact 213 rests.

The relay 204 closes a circuit by its contact 214 which, starting from the stud 215, the conductors 216, the switch 217, the conductor 218, reaches the earthed switch 219. As soon as the relay 112 drops, the electro-magnet 200 is put under voltage by the following circuit: source 220, conductor 221, switch 222, conductor 223, switch 224, conductor 225, stud 226, contact 208, conductor 209, switch 210, conductor 211, switch 212, 213, earth. The electromagnet 200 attracts its armature 199 and the fingers 197, 198 lower on to the pinion 182, 194 and thus correctly align the engraved rollers 183, 190 for providing satisfactory printing. Should the roller 190 showing the weight in hundreds and thousands of kilogrammes not be in a correct position, the flexible connection made by the resilient elements 192, 193 enable the latter to be easily aligned. The descent of the fork 196 has the effect of closing the switch 227 feeding, by means of the conductor 228, the electro-magnet 203, the latter attracts its mobile armature 202a, the striker 201 is actuated, and owing to this, the weight is printed on a strip of paper placed on the striker 201, under an inked ribbon placed between the paper and the rollers. The movement of the mobile armature 202a has the effect of closing a switch 229 and this causes the putting under voltage of a relay 230, by means of the following circuit: current source 231, relay 230, conductor 232, switch 229, earth.

The relay 230 being under voltage, it cuts out the circuit of the electro-magnet 200 by opening the switch 224. The putting under voltage of the relay 230 has the effect of opening the switch 217 and thus the relay 204 ceases to be excited. Immediately, the mobile armature 199 rises by its own resiliency and this movement has the effect of opening the switch 227. The feed circuit of the electro-magnet 203 being cut out, the striker 201 is lowered.

This movement also causes the opening of the switch 229 which opens the feed circuit of the relay 230 which falls, and the unit is thus once more at rest.

When connecting up the small box 178 containing a printing device, the connections are eliminated in the zones A, B (FIG. 3) on the conductors 59, 139, so that the alignment device for the printing rollers can operate freely, even in the case when a starting up of a new weighing might be caused by pressing the button 50, before the cycle of printing operations has finished. Actually, the putting under voltage of the relays 204, 230 has the effect of opening the switches 233, 234, 235, 236. The opening of these switches causes the opening of the circuits controlled by the button 50.

In the case where the weighing has been disturbed and where the relay 164 operates as explained above, the circuit of the electro-magnet 200 as well as the maintenance circuit of the relay 204 are cut out, so as to prevent a wrong printing owing to an incorrect weighing.

In FIG. 7, devices 237, 238, 239 are shown in perspective, which enable, at the same time as weighing, the printing of various information, such as, for example, the date, the number of the weighing, the number of the wagons, the time, etc. These devices are hand operated and can be set out in the small box 178 on the right of the latter, as shown in FIG. 8.

A button 300 enables a switch 301 to be closed and simultaneously the exciting of the electro-magnet 200 operating the aligning device. Thus, the starting up can be repeated of all the printing devices for obtaining a second printing of the weight, if so required. As soon as the button 300 is released, the whole of the printing members assume their rest position.

Figure 4:
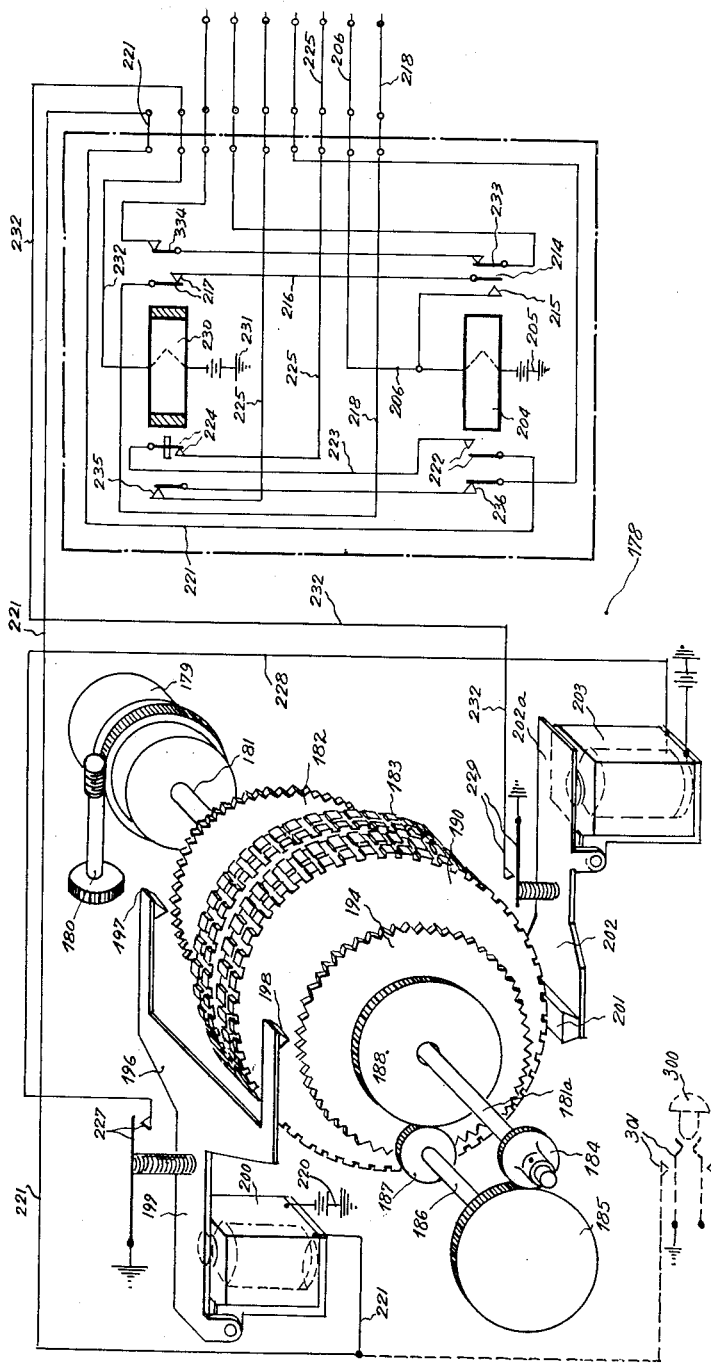

In the foregoing, a single pointer 44 moves in front of the graduated dial 45, but in certain cases, this dial can comprise two graduations arranged concentrically and a second pointer to move in front of a second graduation by means of a reducing device identical to that shown in FIG. 4 for driving the roller 190 showing the weight weighed by the scales in hundreds and thousands of kilogrammes. Thus, with the two pointers, it is easy to read the weight of the objects weighed by the scales.

It is sometimes necessary to ascertain the weight of the container of an object weighed by the scales, and in this case the weight of this container has no interest. For directly obtaining the weight of the contents, the devices for showing the weight are disengaged when weighing the container, and when the tare has been ascertained, the devices showing the weight are re-engaged. To do this, the pointer 44 moving in front of the graduated dial 45, is mounted on an intermediate shaft 310 which carries a flexible pinion 311 able to mesh with a pinion 312 attached to the end of the shaft 38. A finger 313, mounted at the end of a lever 314, distorts the pinion 311 under the action of a spring 315 when the electro-magnet 316 is not fed. As soon as this electro-magnet 316 is fed, the lever 314 pivots in the opposite direction to that of the action of the spring 315, the finger 313 recoils and the flexible pinion 311 meshes with the pinion 312. A connection is thus obtained between the emitter-transmitter 39 and the pointer 44 showing the weight of the object weighed. The feed circuit 317 of the electro-magnet 316 is closed by the operator when starting the second weighing.

Figure 9:
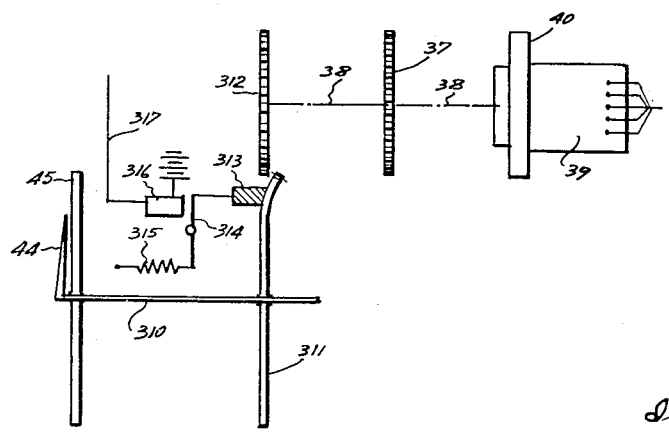
FIG. 9 is a diagrammatical plan of a device added to the scales.

A device similar to that shown in FIG. 9 can be mounted on the printing device between the receiver 179 and the printing rollers 183, 190.

Figure 10:
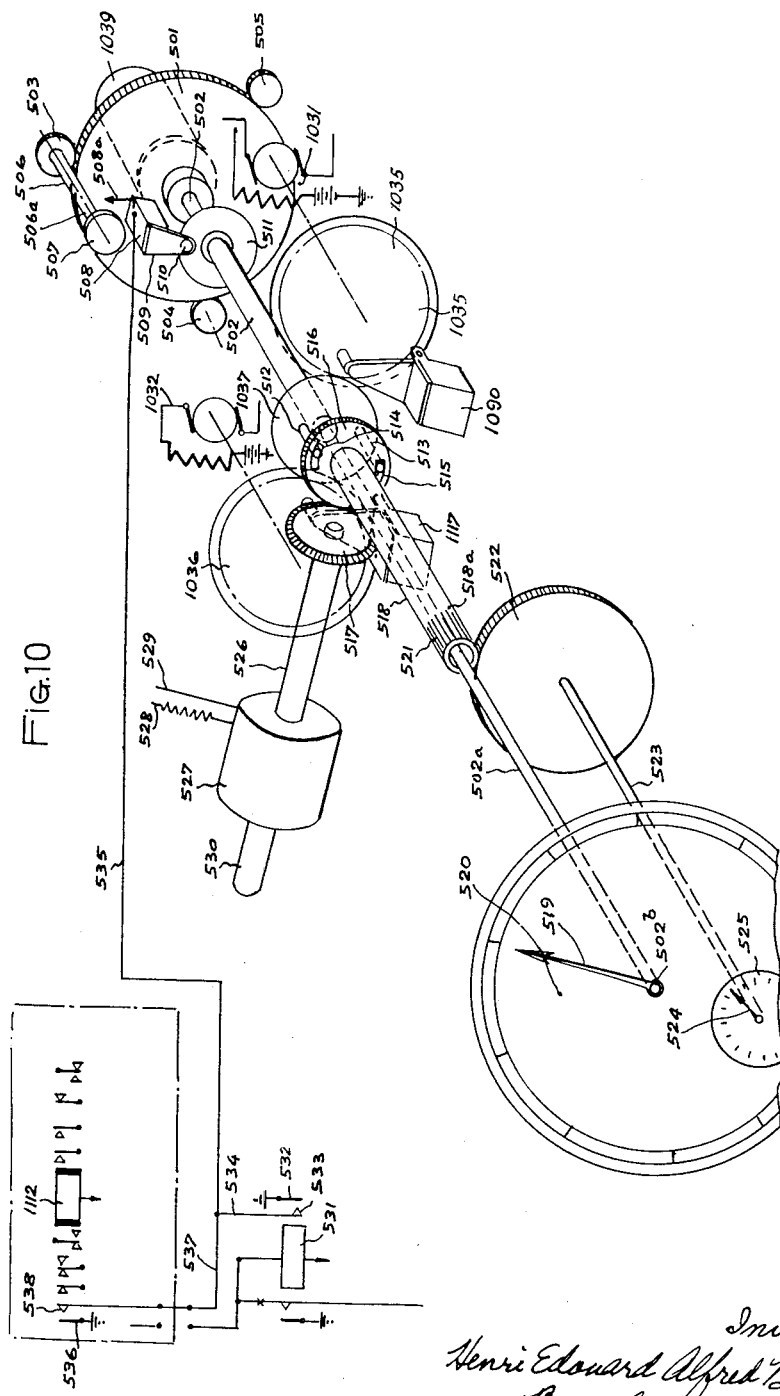
FIG. 10 is a perspective view of a device for putting the scales back to zero.

FIG. 10 shows an alternative embodiment of the device enabling the net weight to be obtained of an object weighed in any kind of container. In this case, the emitter-transmitter 1039 is fixed on a disc 501 comprising a hole in its middle through which the shaft 502 passes loosely integral with the rotor of the emitter-transmitter 1039. The disc 501, which has teeth on its periphery, rests on three pinions 503, 504, 505 placed at 120° to each other, these pinions being loosely mounted on spindles integral with one of the plates fixed on the frame of the scales. The pinion 503 comprises an extension 506 which is provided with an operating button 507 at its end 506a, whose role will be explained farther on. An electro-magnet 508 is fixed on the disc 501 and bears on a mobile armature 509 having a finger 510 at its lower end locking, under the action of a spring, a small disc 511 mounted on the shaft 502. This shaft carries the intermediate pinion 1037 which can mesh, sometimes with the pinion 1035, at others with the pinion 1036 which are connected, the one to the motor revolving at high speed 1031, the other with the motor revolving at low speed 1032.

The electro-magnets 1090, 1117 are shown diagrammatically which enable the disengaging by turns of the pinions 1035, 1036 from the pinion 1037. The latter has two fingers 512, 513 whose ends penetrate into arched slots 514, 515 made in a pinion 516 which engages a second pinion 517 at a suitable angle. The pinion 516 is mounted on a bushing 518 revolving loosely around the extension 502a of the shaft 502, this extension carrying a pointer 519 at its end 502b able to turn in front of a dial 520. The bushing 518 comprises teeth 521 at its free end 518a, co-operating with a pinion 522 mounted at one end of a shaft 523 whose other end carries a pointer 524 turning in front of a dial 525 printed at the bottom part of the dial 520.

The gearing down obtained by the teeth 521 and the pinion 522 is such that, for example, for ten revolutions of the teeth 521 the pinion 522 only makes one revolution.

The pinion 517 is mounted at the end of a shaft 526 integral with the rotor of a motor 527 fed by conductors 528, 529. The rotor of the motor 527 is connected up, at the end opposite to that of the shaft 526, to a shaft 530 rotatively driving a device showing the weight weighed by the scales.

In the foregoing, we have shown that when the slide-weight is put into operation, the brake was released under the action of the electro-magnet. The putting under voltage of this electro-magnet causes, at the same time, the putting under voltage of a relay 531, which, when excited, brings a contact 532, on to a stud 533 connected by conductors 534, 535 to the electro-magnet 508. The latter, whose mobile armature 509 locks the small disc 511, thus prevents the free rotation of the rotor of the emitter-transmitter 1039, because when the disc is locked by the finger 510, the rotor of the emitter-transmitter 1039 is integral with the stator by means of the disc 501. The putting under voltage of the electromagnet 508 causes the disengaging of the mobile armature 509, the finger 510 no longer rubs against the disc 511 and the rotor of the emitter-transmitter 1039 is free.

The feed circuit of the electro-magnet 508 is as follows: current source 508a, electro-magnet 508, conductors 535, 534, stud 533, contact 532, earth.

Throughout the weighing, the assembly of the members of the scales operates as described above.

When the high speed motor 1031 stops, the slide is locked by its brake and the relay 531 ceases to be excited and falls. The electro-magnet 508 is no longer fed, the disc 511 is again locked.

When the low speed motor 1032 is started up, the delayed relay 1112 is excited and attracts a contact 536 that is earthed. Immediately, the electro-magnet 508 is again fed because it finds, by the intermediary of the conductors 535, 537, the stud 538, an earth behind the contact 536 resting on the stud 538. The disc 511 is free and the rotor of the emitter-transmitter 1039 can revolve.

As soon as weighing is finished, the relay 1112 ceases to be excited and the contact 536 separates from the stud 538, the electro-magnet 508 is no longer fed, the disc 511 is again locked.

As already explained above, owing to the reversible electric connection of the rotor of the emitter-transmitter 1039 with the rotor of the receiver, the rotor of the receiver can accurately effect the alignment of the emitter-transmitter on its position which is function of the balance position of the scale beam. Thus, the pointers 519, 524 stop in front of the dials 520, 525, while showing accurately the weight of the load which is on the platform of the scales. Owing to the counter-angle 516, 517, the printing device integral with the shaft 530 is correctly aligned.

As soon as weighing is finished, the motor 527, which is very low powered, is put under voltage and brings the fingers 512, 513 into abutment at one of the ends of the arched slots 514, 515 so that the scales operate immediately without any shifting during the following weighing. The end of the putting under voltage takes place when the scales are returned to zero.

When it is desired to ascertain the weight of an object contained in any kind of recepetacle, the empty receptacle is first weighed, then the slide-weight is left in its balance position. The pointers 519, 524 are then put back to zero by proceeding in the following manner: The knob 507 is turned which drives the pinion 503 meshing with the toothed disc 501. As the latter is integral, by the intermediary of the finger 510, with the disc 511, the shaft 502 is rotatively driven, the pointer 519 returns to zero. Likewise, by means of the fingers 512, 513, the pinion 516 drives the bushing 518 whose teeth 521 cause the rotation of the pinion 522 integral with the shaft 523 to whose end is fixed the pointer 524 which returns to zero. The rotation of the angle pinion 516 causes the rotation of the angle-pinion 517 and thus the additional device integral with the shaft 530 is put back to zero. When the object to be weighed in the receptacle returns to the platform of the scales, the latter immediately give the weight of the object placed in the container.

Various modifications can moreover be applied to the form of embodiment shown and described in detail, without going outside the scope of the invention.

I claim:

1. In electrically operated automatic platform scales comprising a beam, a slide-weight moving along the beam, said slide-weight composed of a carriage, a receiver mounted on said carriage, said receiver including a rotor, a rotative pinion driven by the rotor of the receiver, a rack carried by the beam along which the pinion rotates, an emitter-transmitter including a rotor, said emitter-transmitter being electrically connected with the receiver mounted on the carriage for electrical transmission of its rotating movement to said receiver, a first motor revolving at high speed, a second motor revolving at low speed, control means for connecting the rotor of said emitter-transmitter at first to said first motor and then at a desired point disconnecting said first motor and connecting said second motor thereto, the rotation of the rotor of said emitter-transmiter acing electrically to cause rotation of the rotor of the receiver mounted on the carriage thereby moving the slide weight along the beam to bring the beam into equilibrium, a graduated dial, a rotative pointer mounted in front of said dial, a mechanical transmission secured between the rotor of the emitter-transmitter and said rotative pointer to indicate the weight of the object weighed on the scales.

2. In electrically operated automatic platform scales comprising a beam, a slide-weight moving along the beam, said slide weight composed of a carriage, a receiver mounted on said carriage, said receiver including a rotor, a rotative pinion driven by the rotor of the receiver, a rack carried by the beam along which the pinion rotates, an emitter-transmitter including a rotor, said emitter-transmitter being electrically connected with the receiver mounted on the carriage for electrical transmission of its rotating movement to said receiver, two motors, one rotating at high speed and the other at low speed, a double clutch formed by two flexible pinions and a pinion integral with the rotor of the emitter-transmitter meshing by turn with one or the other of said two flexible pinions, said flexible pinions being driven respectively by said motors, two electro-magnets put under voltage one after the other when the aforesaid motors are fed, means for deflecting said two flexible pinions by the action of the electro-magnets when the latter are not under voltage to mesh one of the flexible pinions with the pinion integral with the rotor of the emitter-transmitter, control means for connecting the rotor of said emitter-transmitter at first to said first motor and then at a desired point disconnecting said first motor and connecting said second motor thereto, the rotation of the rotor of said emitter-transmitter acting electrically to cause rotation of the rotor of the receiver mounted on the carriage thereby moving the slide weight along the beam to bring the beam into equilibrium, a graduated dial, a rotative pointer mounted in front of said dial, a mechanical transmission secured betwen the rotor of the emitter-transmitter and said rotative pointer to indicate the weight of the object weighed on the scales.

3. In electrically operated automatic platform scales comprising a beam, a slide-weight moving along the beam, said slide-weight composed of a carriage, a receiver mounted on said carriage, said receiver including a shaft on which is fixed a rotor, a disc integral with the shaft of the rotor, a brake for locking said disc, an electro-magnet mounted on the slide-weight actuating said brake, a slide-contact feeding said electro-magnet, conductors integral with the beam, said slide-contact rubbing on said conductors, relays connected with said conductors, said relays acting in response to the position of the beam to lock and release the slide-weight by the action of the brake actuated by said electro-magnet, a rotative pinion driven by the rotor of the receiver, a rack carried by the beam along which the pinion rotates, an emitter-transmitter including a rotor, said emitter-transmitter being electrically connected with the receiver mounted on the carriage for electrical transmission of its rotating movement to said receiver, two motors one rotating at high speed and the other rotating at low speed, a double clutch formed by two flexible pinions and a pinion integral with the rotor of the emitter-transmitter meshing by turn with one or the other of said two flexible pinions, said flexible pinions being driven respectively by said motors, two electro-magnets put under voltage one after the other when the aforesaid motors are fed, means for deflecting said two flexible pinions by the action of the electro-magnets when the latter are not under voltage to mesh one of the flexible pinions with the pinion integral with the rotor of the emitter-transmitter, control means for connecting the rotor of said emitter-transmitter at first to said first motor and then at a desired point disconnecting said first motor and connecting said second motor thereto, the rotation of the rotor of said emitter-transmitter acting electrically to cause rotation of the rotor of the receiver mounted on the carriage thereby moving the slide weight along the beam to bring the beam into equilibrium, a graduated dial, a rotative pointer mounted in front of said dial, a mechanical transmission secured between the rotor of the emitter-transmitter and said rotative pointer to indicate the weight of the object weighed on the scales.

4. Electrically operated automatic platform scales according to claim 13 in which a second receiver is connected to the emitter-transmitter, and engraved rollers on said second receiver for printing the weight of the object weighed by the scales.

5. Electrically operated automatic platform scales according to claim 4, in which there is an aligner formed by a fork with fingers, pinions integral with the engraved rollers and operating with said fingers, an electro-magnet controlled by the relays connected to the electric circuit operating the automatic platform scales, said electromagnets operating said aligner.

6. Electrically operated automatic platform scales according to claim 5, in which there is a striker for printing the weight shown by the engraved rollers, an electro-magnet controlled by the relays, said electro-magnet actuating said striker.

7. Electrically operated automatic platform scales, according to claim 6, in which a reducing gear is interposed between the receiver actuating the engraved rollers and the rollers showing the weight in hundreds and thousands of kilogrammes.

8. Electricaly operated automatic platform scales according to claim 6, in which there is a friction device controlling the disc fixed on the rotor shaft of the receiver during slow speed movement of the slide weight, and an electro-magnet controlled by relays operating the automatic platform scales.

9. Electrically operated automatic platform scales according to claim 8, in which there is a clutch included in the mechanical transmission secured between the rotor of the emitter-transmitter and said rotative pointer.

10. Electrically operated automatic platform scales according to claim 9, in which the emitter-transmitter is fixed on a toothed disc carried by an electro-magnet whose mobile armature attracted by a spring locks a disc integral with the transmission connecting the emitter-transmitter to the devices showing the weight of the objects weighed so that when the emitter-transmitter is at rest these indicating devices can be put back to zero by turning the toothed disc round.

11. Electrically operated automatic platform scales according to claim 9, in which the toothed disc rests on three pinions mounted at an angle of 120° to each other, these pinions being loose on spindles integral with the frame of the scales.

12. Electrically operated automatic platform scales according to claim 9, in which the electro-magnet fixed on the toothed disc is fed for releasing the disc integral with the indication transmission by the putting under voltage of relays controlled by the relay box of the scales.

13. Electrically operated automatic platform scales, according to claim 9, in which two pinions forming a counter-angle and controlling the working of supplementary indicators of the weights weighed by the scales are provided with a device enabling the correct alignment of the supplementary indicators on the rotor of the emitter-transmitter.

References Cited in the file of this patent

UNITED STATES PATENTS

| | | |
|---|---|---|
| 633,471 | McGarvey | Sept. 19, 1899 |
| 1,049,535 | Rosenfield | Jan. 7, 1913 |
| 1,241,672 | Smith | Oct. 2, 1917 |
| 1,365,799 | Smith | Jan. 18, 1921 |
| 2,392,023 | Cooper | Jan. 1, 1946 |